(12) United States Patent
Dayan et al.

(10) Patent No.: US 7,474,875 B1
(45) Date of Patent: Jan. 6, 2009

(54) NETWORKING INTEGRATION OF WIRE-FREE ELECTRIC POWER SURFACE

(76) Inventors: Tal Dayan, 14400 Blossom Hill Rd., Los Gatos, CA (US) 95032; Dan Kikinis, 20264 Ljepava Dr., Saratoga, CA (US) 95070

( * ) Notice: Subject to any disclaimer, the term of this patent is extended or adjusted under 35 U.S.C. 154(b) by 650 days.

(21) Appl. No.: 10/727,244

(22) Filed: Dec. 2, 2003

Related U.S. Application Data

(60) Provisional application No. 60/430,413, filed on Dec. 2, 2002.

(51) Int. Cl.
*H04B 7/00* (2006.01)
(52) U.S. Cl. ............ 455/41.2; 455/557; 455/556.1; 455/558; 455/277.1; 455/275; 455/552.1; 455/556.2; 343/702; 343/700 MS; 375/132; 361/683; 702/178
(58) Field of Classification Search .......... 455/41.2, 455/552.1, 558, 557, 556.1, 277.1; 361/683; 702/178
See application file for complete search history.

(56) References Cited

U.S. PATENT DOCUMENTS

| | | | |
|---|---|---|---|
| 6,628,236 B2 * | 9/2003 | Kim et al. ............. | 343/702 |
| 6,690,657 B1 * | 2/2004 | Lau et al. ............. | 370/315 |
| 6,745,047 B1 * | 6/2004 | Karstens et al. ....... | 455/556.1 |
| 6,751,476 B2 * | 6/2004 | Masaki et al. ......... | 455/558 |
| 6,816,925 B2 * | 11/2004 | Watts, Jr. ............ | 710/36 |
| 6,829,288 B2 * | 12/2004 | Orava ................ | 375/132 |
| 6,833,818 B2 * | 12/2004 | Kim et al. ........... | 343/702 |
| 6,886,095 B1 * | 4/2005 | Hind et al. .......... | 713/168 |
| 6,993,358 B2 * | 1/2006 | Shiotsu et al. ........ | 455/552.1 |

* cited by examiner

*Primary Examiner*—Marceau Milord
(74) *Attorney, Agent, or Firm*—Holland & Knight LLP; John P. Moran

(57) ABSTRACT

An apparatus including surface that includes a set of contact points, the surface to provide a medium to transmit data between a first device in contact with one or more contact points of the surface, and a second device in contact with one or more contact points of the surface. In one embodiment, the surface is to provide a medium to non-aerial wirelessly transmit data between the first and second device. In one embodiment, at least one of the first and second devices are exclusive of aerial wireless data transmission capabilities. In one embodiment, the surface is to provide a medium to transmit data between the device and a third device separated from the surface.

17 Claims, 3 Drawing Sheets

NETWORKING INTEGRATION OF WIRE-FREE ELECTRIC POWER SURFACE

This application claims priority to related provisional application No. 60/430,413 filed Dec. 2, 2002 titled "Networking Integration of Wire-Free Electric Power Surface", and is herein incorporated by reference.

BACKGROUND

Often, two devices of the types of those mentioned above may need to be synchronized with each other. In some cases, said devices may have wireless networking capabilities, such as IEEE standard 802.11x or similar, or Bluetooth, or a proprietary protocol. However, in some situations, for very low-cost devices, such wireless access facilities may not be available. Furthermore, some people have big concerns about the security of these "aerial wireless" (radio) connections.

The other alternative currently is using a cradle with lots of wires.

What is clearly needed is a system and method to allow "non-aerial wireless" (non transmitted radio) exchange of data between two devices in cases where one or both devices does not necessarily have an integrated "aerial wireless" networking capabilities.

DESCRIPTION OF THE EMBODIMENT

This disclosure describes a system and a method to implement a surface that would be used for data transfer and synchronization between devices. In one embodiment, one solution is a system that modulates a carrier frequency onto the electric conducting system of the wire-free electric power transmission system (non aerial wireless), to allow networking between devices for synchronization between them. In an alternative embodiment, a slow data mechanism may be used on the base band, for example to initiate wireless exchange of data by providing a secure key exchange, or just use base band networking approach.

When devices are placed on the same surface, they would be able to 'find' each other and interoperate automatically. For example, a notebook and a PDA could sync data or a notebook could find a printer and print on it. Also, some devices could be external to the surface but could be recognized through the surface. For example, the surface could be configured to have a remote printer as a local virtual device, so when a notebook is placed on the surface, it would automatically recognize the printer and could print on it.

Note that the data transfer would not be necessarily through the contacts (or at least not all of it). A device may be placed on or near a surface such that it has access devices and services that are in the 'neighborhood' of that surface.

Figure 1:
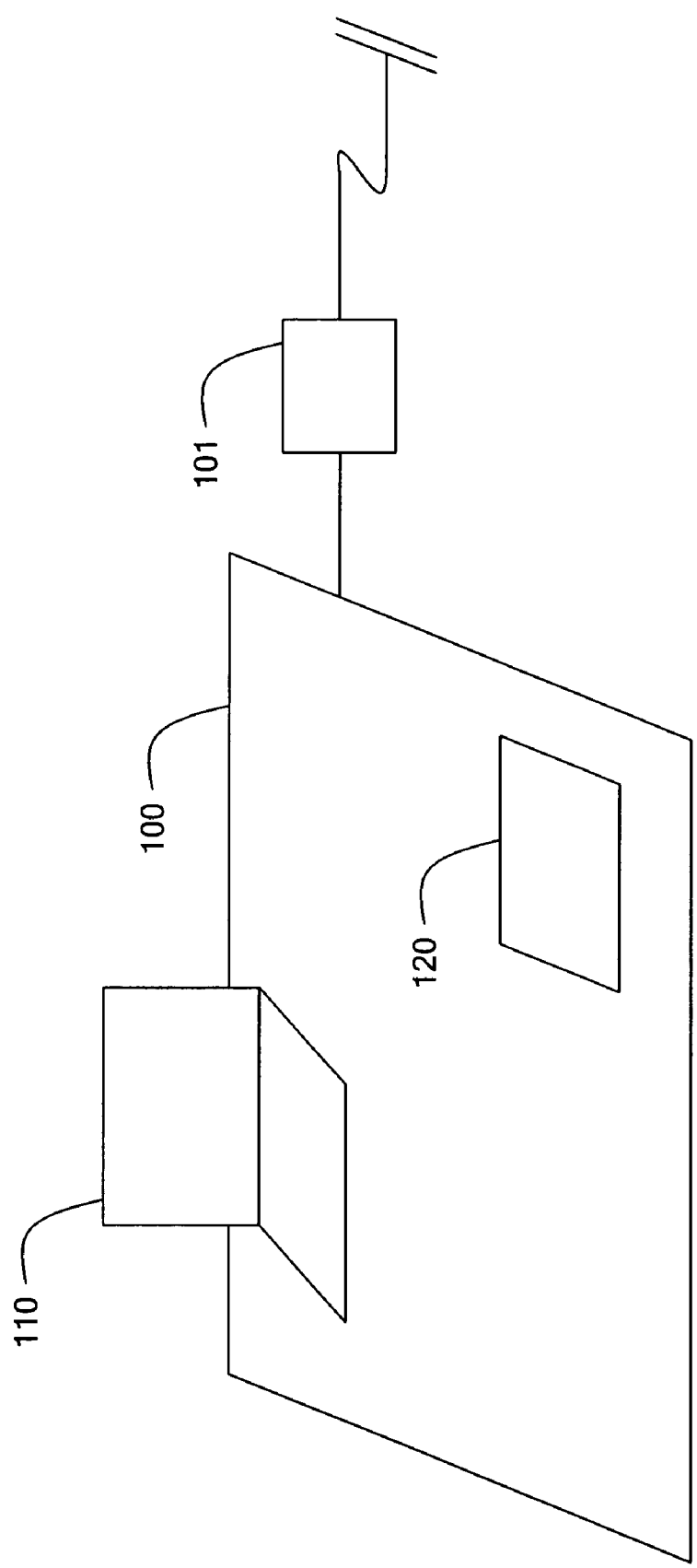
FIG. 1 illustrates a notebook 110 and a PDA 120 on a surface 100, with an external power supply 101, in accordance with one embodiment.

In an example of this disclosure, a notebook and a PDA, when placed on the same surface, try to synchronize with each other (with or without a need for user confirmation). FIG. 1 shows a notebook 110 and a PDA 120 on a surface 100, with an external power supply 101. The devices depicted in FIG. 1 are selected purely for illustrative purposes. It is clear that many other alternative combinations and embodiments may be used to illustrate this disclosure. For example, the devices may be PDA and a cell phone or they may be two notebooks; the power supply 101 may be integrated into the surface 100; the surface may reside on the notebook instead of under the notebook; etc.

Figure 2:
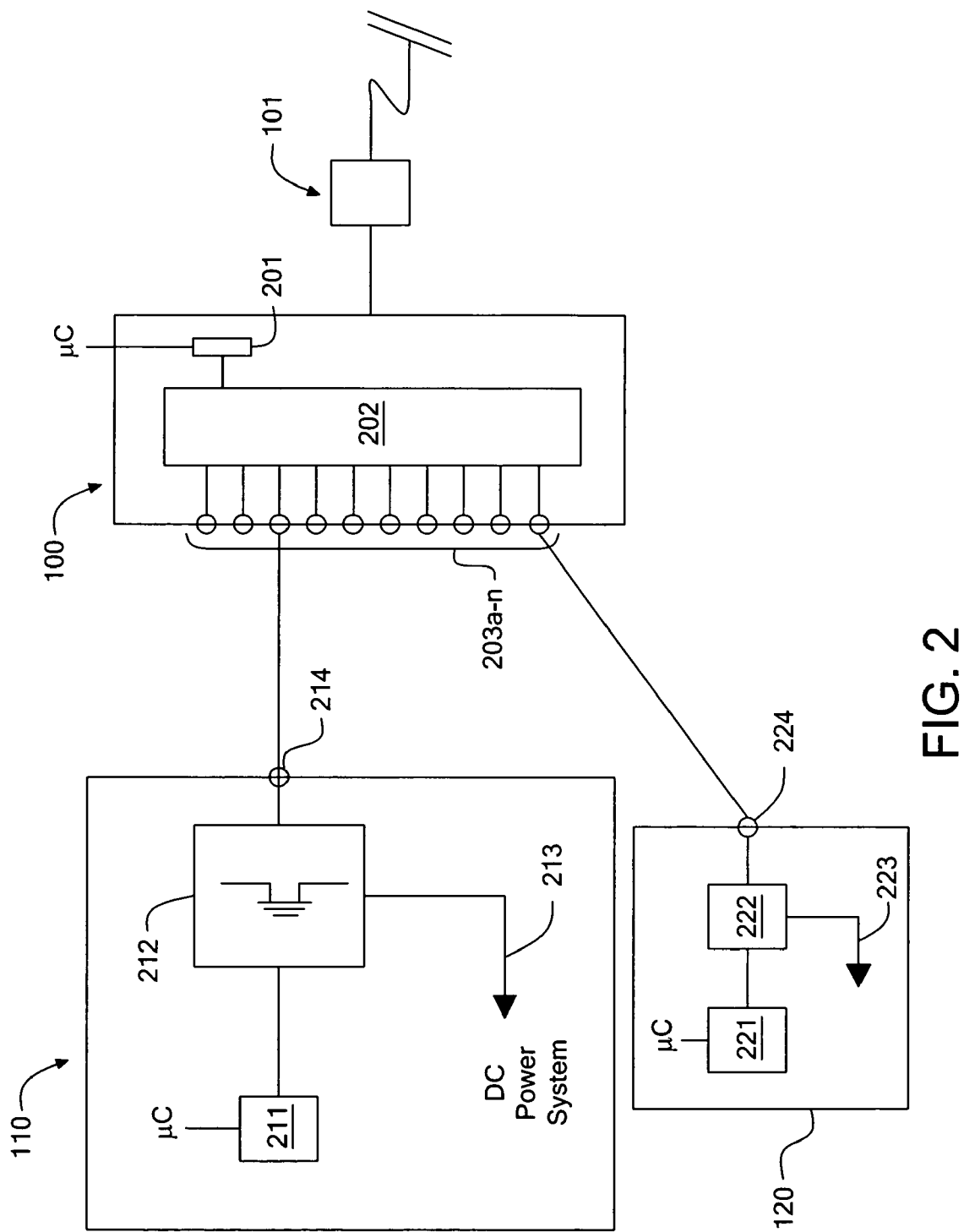
FIG. 2 illustrates a diagram of the internal components of a device to be used with the surface, in accordance with one embodiment.

FIG. 2 shows a simplified diagram of the internal components for one implementation of this disclosure. Notebook 110 contains, along with other standard components well-known to those skilled in the art, a microcontroller 211, as discussed in the previous disclosures, which are attached in the appendix as A-L and are incorporated herein, and some safety switch mechanism 212 that turns on the connection to contact points 214 (for simplicity and clarity, only one contact point is shown; typically, however, such a system would have multiple contact points). The power feed 213 comes out of the safety switch 212 to supply the notebook with power as needed. Safety switch 212, in addition to containing a matrix of transistors, may include some filtering components, described below, to connect the data paths from microcontroller 211.

A similar simplified block diagram of PDA 120 in FIG. 2 shows its components pertaining to this disclosure, including microcontroller 221, switch 222, power lead 223, and contact points 224.

Surface 100 has a switch matrix 202; the switch contacts 203 *a-n*, from which at least one pair connects to each device (for purposes of simplicity and clarity, only a single example wire is shown); and microcontroller 201, which identifies the devices and accordingly requests power supply 101 to deliver the correct voltage and current via switch matrix 202 to the correct set of contacts.

In some cases, this "slow communication" process described above may be used by one device to contact another device, so that notebook 110, for example, could use microcontroller 211 to send a key to PDA 120, thus enabling the two devices to communicate with each other, using a standard 802.11d protocol, for example, or any other kind of wireless communication protocol, such as 802.11a, 802.11j, etc., or Bluetooth, or any other nonstandard or proprietary wireless communication protocol or system.

Figure 3:
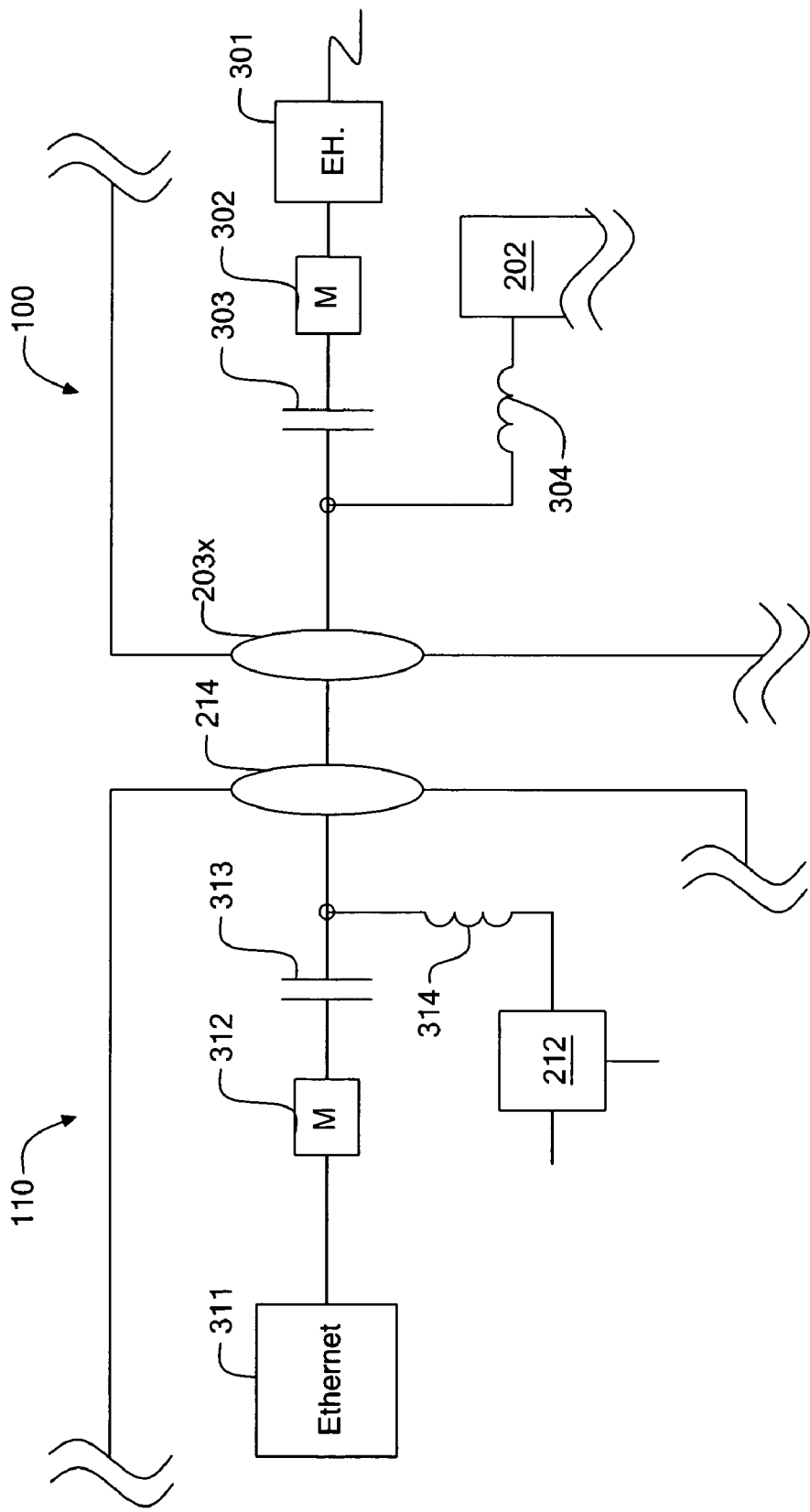
FIG. 3 illustrates a partial view of the internals of notebook 110 and surface 100, in accordance with one embodiment.

FIG. 3 shows simplified partial views of the internals of notebook 110 and surface 100. Rather than using a slow-speed protocol, such as mentioned above in the description of FIG. 2, the devices use a high-speed protocol, such as Ethernet or other equivalent, or even a modulated 802.11, etc. Controller chips for said high-speed communication are represented by chip 311 for the protocol and chip 312 for the media access control (MAC) or radio adaptation. A low-pass/high-pass switch filter is shown in a simplified manner, represented by components 313 and 314. The low-frequency handshake signal of the surface, which runs typically in the kilohertz range or tens of kilohertz range, would go through inductor 314; whereas the RF type data signal of the Ethernet or 802.11x, etc. protocol, would go through capacitor 313. It is clear that other, more elaborate filters may be implemented by one skilled in the art. Again, contact point 214 is shown as a single component. In reality, it would be a differential line, as the dc power transmission requires at least two contacts. A transceiver in chip 312 and two capacitors and two inductors would be used, or in some cases more elaborate filter systems can be used, such as a combination band-pass and low-pass/high-pass.

An equivalent, mirroring system exists on the surface 100, in which chip 301 would connect to a backbone network or a hub. All devices connected to switch matrix 202 could then be connect via a common bus. This approach is the preferred embodiment.

In cases of multiple voltage rails 203, different MAC adaptors may be needed. Further, on a device such as notebook 110, the Ethernet or 802.11 chip may have a switchable MAC adaptor, meaning that in some cases it communicates to a port, such as a standard Ethernet port, and in other case, it communicates to the surface 100. Similarly, the 802.11 system may in some case transmit over an antenna, and in other cases, over conducting wires between contact points 214 and surface points 203x.

Further, in some applications, this disclosure may be used to transmit video between the surface 100 and a display device placed on it. Example display devices may be a large wire-free LCD monitor that receives a display signal from a notebook computer placed on the surface, or a stand-alone wire-free console that displays news bulletins and marketing information, or a wire-free TV that displays cable channels programming.

Many options are available for resolution, image quality and update speed (refresh rate) between low-end signals such as NTSC and high-end signals such as HDTV or DVD applications. The actual method used for video data transfer should be the one that achieves a good balance between time-to-market, complexity and manufacturing-cost on one hand, and satisfying all or most of the application requirements on the other hand.

The following paragraphs describe an example method of transferring a video-signal. Based on readily available technologies and standards, said example method provides good signal quality.

The example method would provide a video link between an analog input, such as component video or S-Video on the surface and a digital flat panel (DFP) monitor conforming to standards defined by the Video Electronics Standards Association (VESA). The video channel would be based on low-level 802.11 transmission that is transmitted over the two contact points of the device. Thus the system could be classified as a 'non intentional emitter' to make an EMI certification more attainable.

The following functions are further examples and can be provided along the video path from end to end:

Video capture would receive the analog input, lock on the sync signal, and covert the analog signal to digital.

Base System-On-Chip (SOC) is the main controller on the surface side video channel. It interfaces between the video capture, the video buffer (see below) and the 802.11 controller. The SOC also handles all the channel transport and application layer and communicates control information with the device.

Video buffer is a memory buffer. Logically, it resides between the video capture and the 802.11 controller. It is used to compensate for speed and burst differentials between the captured video input and the surface's 802.11 transmitter.

802.11 controller with a low-level RF transceiver.

Base power/data splitter separates the power (dc) and the RF of the communication. The splitter is a simple passive network based on high current, very low inductance inductor(s) and one or more capacitors.

Base power routing matrix and contacts is the standard power routing matrix of the surface contacts grid.

Adapter side contacts are the mobile device's two standard contacts.

Adapter power/data splitter is similar to the surface's splitter.

802.11 RF and controller is similar to the same function in the surface.

Adapter SOC controller controls of the 802.11 channel, handles the transport and application layers, and has a DFP interface which provides the video output.

Various changes may be made, without departing from the spirit of the invention. For example the surface does not have to provide power, but can be used just for the communication. Also, the device does not have to be a 'surface' (i.e. substantially flat), but can have other shapes. Further, it may be used as a LAN (local Area Network), as a section or piece of a LAN, and or as a connection to the Internet. The network connection can also be used to connect to and or from the internet, connect to virtual devices, be used for streaming (e.g. a wire free web cam, or an internet radio), synchronization with a remote device, remote control and monitoring, or also allowing to define 'affinity' between two remote surfaces on the network such that they are consider as one as far as the sync is concerned, etc.

Further, in the case of use of RFID, proximity (or contact when non-RFID) of the device to the surface is used for authorization, association, tracking, billing etc. The authorization can open ended, or by use, or by a period of time the device is in the proximity of the base. It can also be used to perform backup or software updates while charging a device.

The techniques of the invention as previously discussed may be implemented, and/or used in conjunction with, the technical specifications as discussed in the attached in Appendices A-L, which are also incorporated herein by reference.

The invention claimed is:

1. An apparatus comprising:
    a first device including a microcontroller, a safety switch mechanism, a power feed coupled to the safety switch mechanism, and contact points;
    a second device;
    a surface including a switch matrix, a set of switch contacts, from which at a first pair couples to the first device, and a second pair couples to the second device,
    a microcontroller to request a power supply deliver an identified voltage and current via switch matrix to at least one of the first and second set of contacts;
    the surface operable to couple to the first device through the at least one contact point to couple to a second device through a second contact point, to establish communication between the first device and the second device through the surface for data exchange, wherein the first and second devices do not include aerial wireless data capabilities.

2. The apparatus of claim 1, wherein the surface is to provide a medium to non-aerial wirelessly exchange data between the first and second device, wherein the second device is separated from or in contact with the surface.

3. The apparatus of claim 2, wherein the first device is to transmit, via the surface, a key to the second device to have the first and second device transmit additional data between the first and second devices via a separate wireless protocol.

4. The apparatus of claim 1, wherein the surface is to provide a medium to exchange data between the first device and a third device, wherein the third device is coupled to the surface via a third contact point.

5. The apparatus of claim 1, wherein the surface is to provide a medium to exchange data between the third device and a fourth device coupled to the surface via fourth contact point.

6. The apparatus of claim 5, wherein the one of first, second, and third devices is one of a notebook computer, a cell phone, and a personal digital assistant (PDA).

7. The apparatus of claim 6, wherein the surface provides an Internet connection to at least one of the first, second and third devices.

8. The apparatus of claim 1, wherein the surface is to supply power to a device via the at least one contact point.

9. The apparatus of claim 1 wherein the safety switch mechanism includes a matrix of transistors.

10. The apparatus of claim 1, wherein the separate wireless protocol is one of a group wireless communication protocol standards comprising of 802.11d protocol, 802.11a protocol, 802.11j protocol, or Bluetooth.

11. The apparatus of claim 1, wherein at least one of the first, second and third devices includes at least one of Ethernet controller, a media access control controller, and a low-pass/high-pass switch filter.

12. The apparatus of claim 1, wherein at least one of the first, second and third devices is a display device, and the surface is to provide a medium to transmit data to the display to be displayed.

13. The apparatus of claim 1, wherein at least one of the first, second and third devices is a display device, and the surface is to provide a medium to transmit video to the display to be displayed.

14. The apparatus of claim 13, wherein the surface includes a video capture to receive an analog input and convert the analog signal to digital to be displayed.

15. The apparatus of claim 14, wherein the surface further includes a Base System-On-Chip to interface between at least one of a video capture, a video buffer, and a controller of the surface.

16. The apparatus of claim 15, wherein the controller of the surface is an 802.11 communication protocol controller.

17. The apparatus of claim 16, wherein the controller of the surface includes a radio frequency transceiver.

\* \* \* \* \*